Patented Mar. 18, 1924.

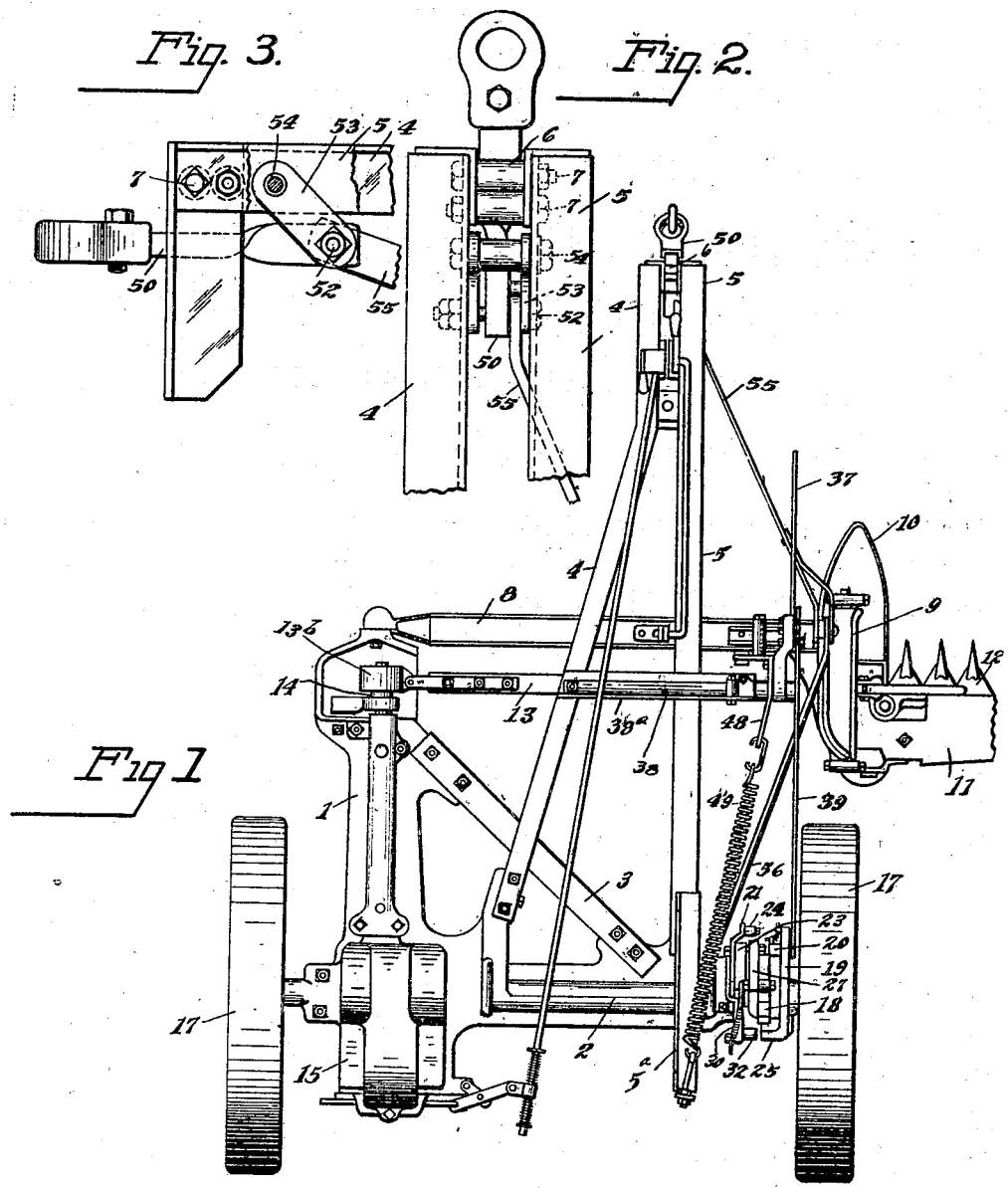

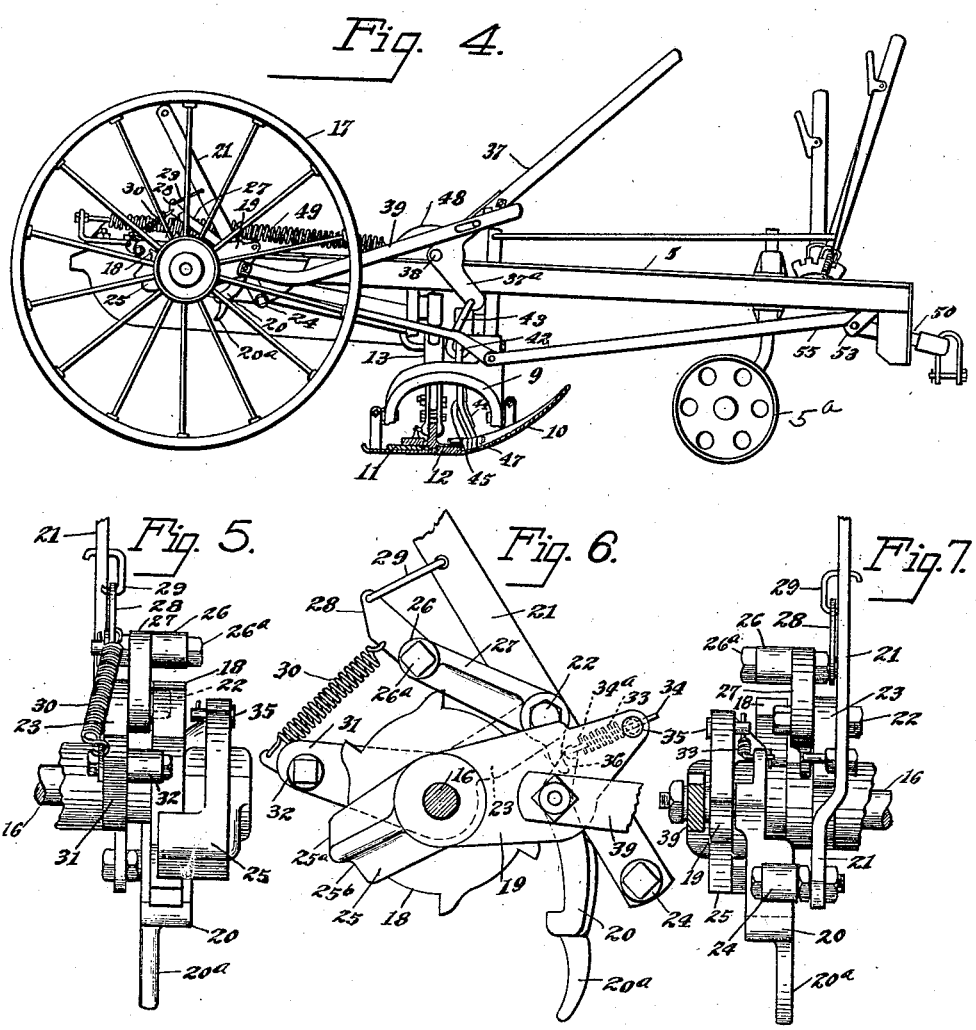

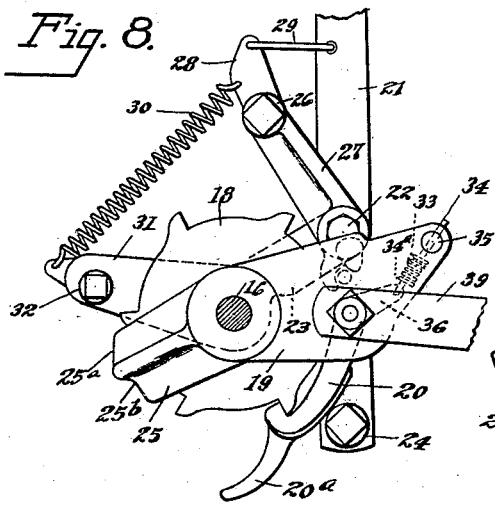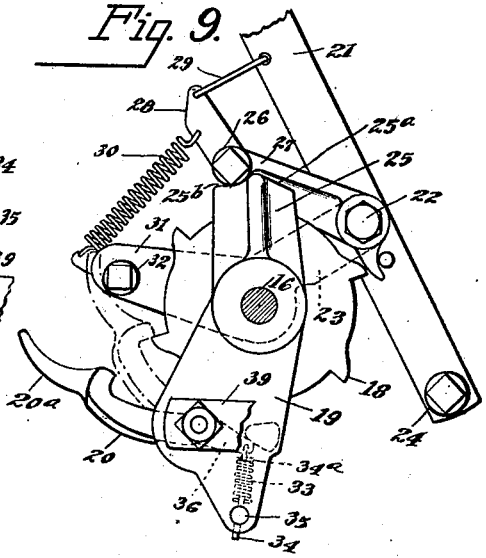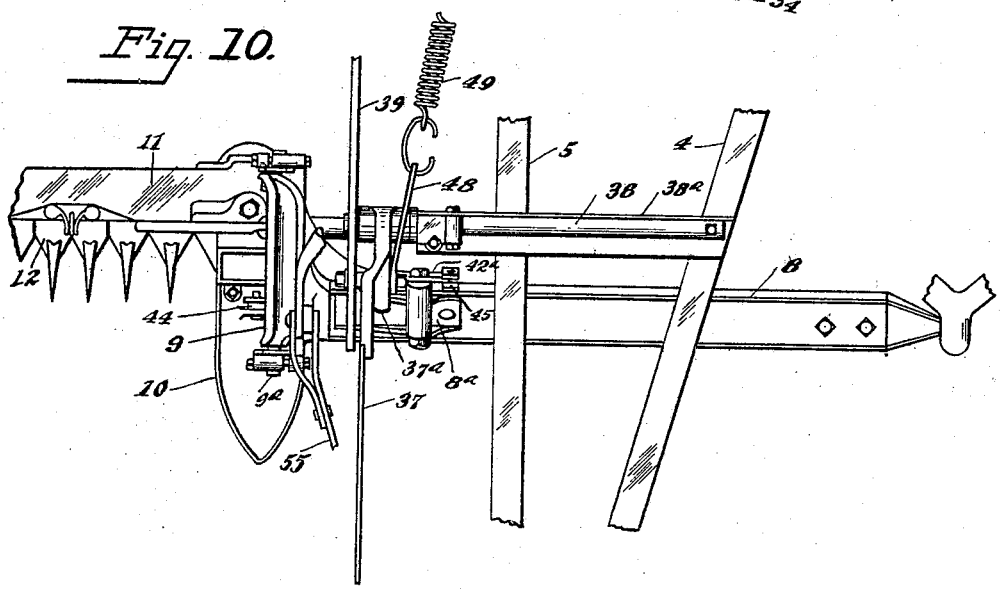

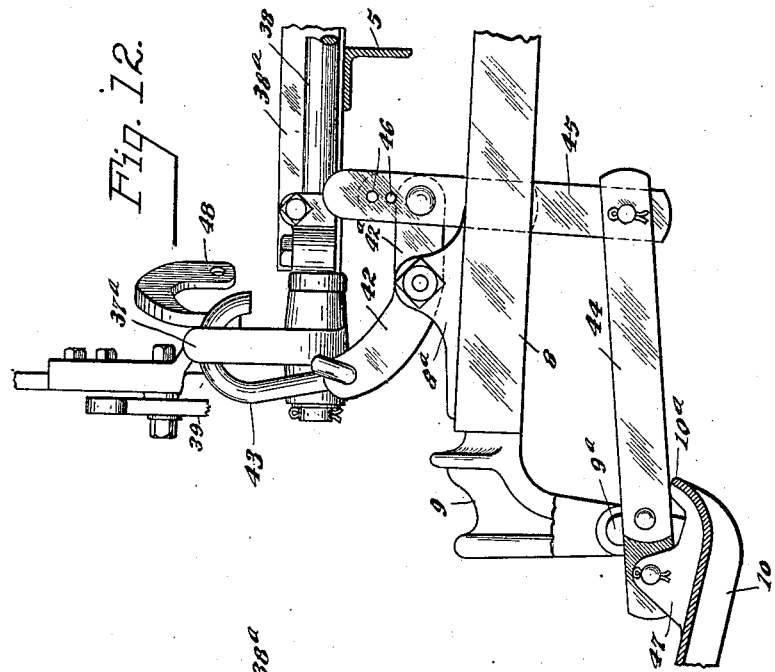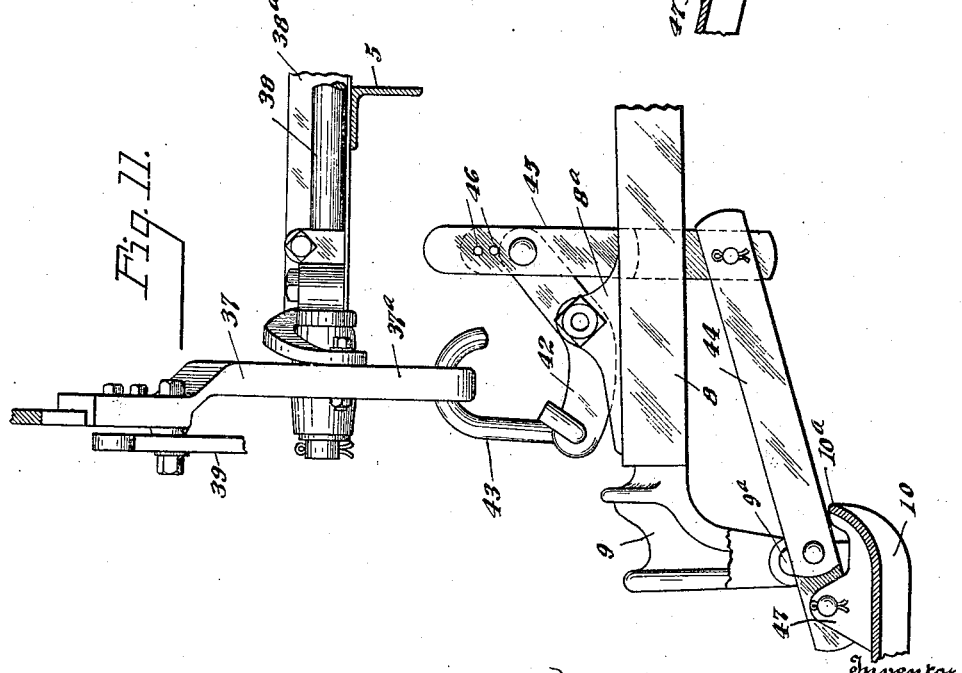

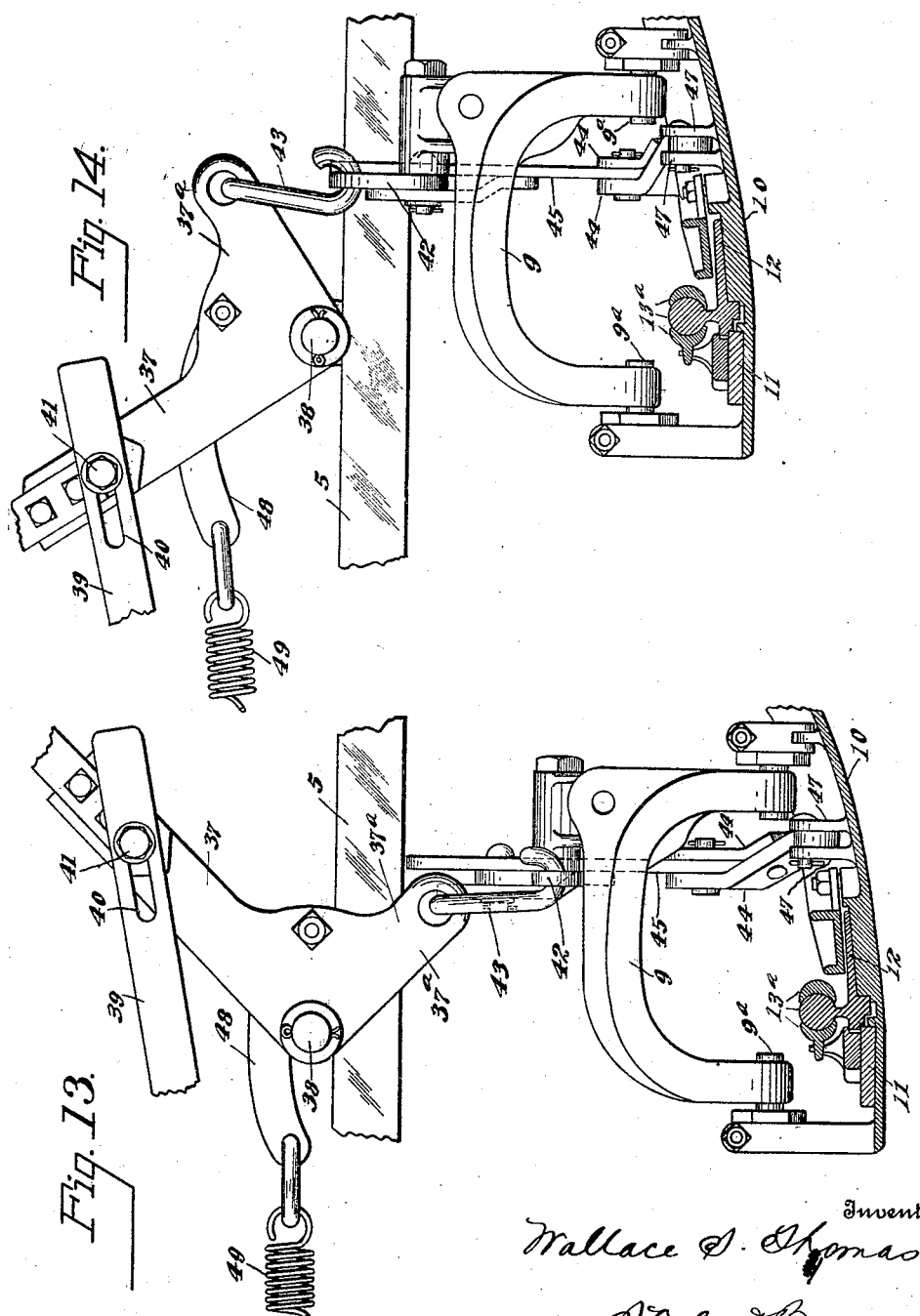

1,487,622

UNITED STATES PATENT OFFICE.

WALLACE S. THOMAS, OF SPRINGFIELD, OHIO, ASSIGNOR TO THE THOMAS MANUFACTURING COMPANY, OF SPRINGFIELD, OHIO, A CORPORATION OF OHIO.

MOWING MACHINE.

Application filed December 5, 1921. Serial No. 520,114.

*To all whom it may concern:*

Be it known that I, WALLACE S. THOMAS, a citizen of the United States, residing at Springfield, in the county of Clark and State of Ohio, have invented certain new and useful Improvements in Mowing Machines, of which the following is a specification.

My invention relates to improvements in mowing machines.

One of the objects of my invention is to provide mechanism for elevating the cutting devices of a mowing machine by power derived from a moving part of the machine, preferably the axle.

A further object of the invention is to provide improved connections with the cutting devices whereby greater leverage is secured in the operation of elevating the same.

A further object of my invention is to provide an improved form of draft appliance, including a connection with the cutting devices and also including a draft bar, which will compensate for the movement of the bar as well as for the rise and fall of the cutting devices during the raising and lowering of the same by the power operated mechanism.

A further object of my invention is to provide a mechanism of the character referred to which will be simple in construction, economical in manufacture and effective for the purpose for which it is designed.

In the accompanying drawings:—

Fig. 1 is a top plan view of a machine embodying my improvements.

Fig. 2 is a top plan view of the extreme forward portion thereof on an enlarged scale.

Fig. 3 is a side elevation of the parts shown in Fig. 2.

Fig. 4 is a side elevation of the machine.

Fig. 5 is a rear elevation of the clutch devices.

Fig. 6 is a side elevation showing the parts in inoperative position.

Fig. 7 is a front elevation of the same.

Fig. 8 is a side elevation of the same showing the position of the parts after the control lever has been operated to throw the dog into engagement with the ratchet wheel.

Fig. 9 is also a side elevation of the same showing the parts after they have been operated to elevate the cutting devices.

Fig. 10 is a top plan view of a portion of the devices on an enlarged scale.

Fig. 11 is a front elevation of a portion of the connections between the clutch devices and the cutting devices showing the same when the cutting devices are in operative relation with the ground.

Fig. 12 is also a front elevation of the same parts showing the position assumed after the cutting devices have been elevated.

Fig. 13 is a side elevation of the parts shown in the preceding Figs. 11 and 12, with the same in the position shown in Fig. 11.

Fig. 14 is also a side elevation of the same showing the parts in the position assumed in Fig. 12.

Referring to the drawings, the main frame consists of a longitudinal extending portion 1, a transversely arranged tubular portion 2 at the rear end thereof and formed integrally therewith, a brace member 3 connecting the same, the forwardly-extending angle-iron beams 4 and 5, spaced apart at their forward ends by the spacing members 6 through which extend bolts 7 which connect the beams together. A coupling frame member 8 of usual form has a ball and socket connection with the forward portion of the frame member 1 and has rigidly secured at its other end a yoke 9 carrying longitudinally-arranged trunnions $9^a$ on which is pivotally mounted a shoe 10 which carries in the usual way a laterally-extending finger bar 11 with which co-operates the usual knife 12, which receives reciprocating motion from the axle and gears (not shown) located in the housing 15 through the pitman 13 and shaft 14, the pitman having a ball and socket connection $13^a$ with the knife at one end and a strap $13^b$ co-operating with an eccentric on the shaft at its other end. The axle 16 extends through the tubular member 2 of the frame and is driven in the usual way from one or both of the carrying wheels 17.

Referring to Figs. 5 to 9 inclusive, a ratchet wheel 18 is connected with the axle 16 to rotate therewith. Loosely mounted upon the shaft 16 at the side of the ratchet wheel is a lever, to one arm 19 of which is pivoted a dog 20. A controlling lever 21 is pivotally connected by the bolt 22 with a bracket 23 which is integrally formed with the tubular frame portion 2, the lower end of this lever carrying a roller 24 which stands in line with the dog 20, while to the upper end of the lever there may be attached a rope extending to any convenient point. When the lever 21 is drawn forwardly, the dog 20 will be thrown into engagement with the ratchet wheel, as indicated in Fig. 8, which carries the lever arm 19 to the position shown in Fig. 9. The dog 20 is held in engagement with the ratchet wheel by a spring 33 on a short rod 34, which rod extends loosely through a pin 35 journaled in the outer end of the lever 19 and having its other end connected to a short arm 36 projecting from the dog; the spring being interposed between the pin 34 and a cotter pin 34$^a$ carried by the rod 34. When the dog is thrown to its engaging position, the arm 36 carries the rod 34 and spring 33 past the center to the position shown in Fig. 8 which causes the spring to exert its influence upon the arm 36 in a way to hold the dog in engagement with the ratchet wheel. To temporarily hold the arm 19 in this position the other arm 25 thereof is provided with an inclined surface 25$^a$ and a recess 25$^b$. Just before the arm 19 reaches the limit of its movement the inclined surface 25 contacts with a roller 26 carried on a pin 26$^a$ which pivotally connects together two arms 27 and 28, the other end of the arm 27 being pivoted on the bolt 22, while the arm 28 is connected to the lever 21 by a pivoted link 29; a spring 30 connected to the arm 28 and to a lug on a bracket 31, formed as an integral part of the frame member 2, serving to normally hold the parts in the position shown in Figs. 6 and 9, to which position they are returned immediately after the lever 21 has been operated and released. After riding over the inclined surface 25$^a$ the roller 26 drops into the recess 25$^b$ and thus retains the arm 19 in the position shown in Fig. 9. In the meantime the tail 20$^a$ of the dog has made contact with the roller 32 carried by the bracket 31, as indicated in dotted lines in Fig. 9, which rocks the dog sufficiently to disengage it from the ratchet wheel, which movement also swings the spring 33 to its normal position, thus permitting the dog to drop to the position indicated in full lines in Fig. 9. To release the lever 19, the long arm of the control lever is drawn forwardly, which withdraws the roller 26 from the recess 25$^b$ and permits the lever to swing to normal position by gravity, or by the weight of the devices connected therewith now to be described.

A connection is made between the operating lever 19 and the cutting devices so that when the lever is operated in the manner described, the cutting devices will be elevated.

Referring now to Figs. 11 to 14 inclusive, a lever 37 is journaled on the end of a stationary rod 38 bolted to an angle-iron strip 38$^a$, which in turn is bolted to the beams 4 and 5 (Fig. 10). This lever 37 is connected to the lever 19 by a pivoted link 39; this link 39 having a slotted opening 40 to receive the pivot pin 41 which connects it with the lever 37 so that the lever may have a limited rearward movement independent of the link to permit a limited rise and fall of the cutting devices due to unevenness of the ground without danger of engaging the arm 25 with the roller 26. Pivoted to an ear 8$^a$ on the frame member 8 is a lever, one arm 42 of which is connected with the short arm 37$^a$ of the lever 37 by a link 43 and the other arm 42$^a$ of which is pivotally connected to the end of a lever 44 by a link 45; the link 45 being provided with a series of openings 46 to provide different points of attachment to the arm 42. The lever 44 has a pivotal connection with a pair of ears 47 projecting up from a shoe 10 forward of the upturned inner edge 10$^a$ thereof. When the cutting devices are in operative relation with the ground the connections are in the position shown in Figs. 11 and 13, but when the lever arm 19 is moved to the position shown in Fig. 9, the lever 37 is rocked so as to swing the short arm 37$^a$ thereof upwardly which in turn through the link 43 raises the arm 42 and depresses the arm 42$^a$ and likewise through the link 45 depresses the long arm of the lever 44 which, bearing upon the edge 10$^a$ of the shoe as a fulcrum, raises the short arm thereof and swings the shoe about its pivotal points on the yoke 9, thus elevating the cutting devices. At the same time, the elevation of the short arm 37$^a$ of the lever 37 lifts bodily the grassward end of the frame member 8 so as to raise the shoe 10 and hence the cutting devices from the ground. The form of connections between the lever 37 and the shoe 10 provides an effective leverage for swinging the shoe 10 about its pivotal points and also provides for the additional elevation of the cutting devices by lifting all the parts bodily in the manner described. By having the link 43 connected with the outer or grassward end of the lever 42—42$^a$, the point of application of the power for lifting the devices bodily is at a maximum distance from the inner or stubbleward end of the coupling frame 8 and hence a minimum amount of power is required to raise the parts.

The lever 37, which may be used as a hand lever for elevating the cutting devices, has pivotally connected therewith a rearwardly extending curved arm 48 the free end of which has connected therewith a long coiled spring 49, the rear end of which is connected to a rearward extension 5$^a$ of the beam 5; this spring being placed under tension when the cutting devices are lowered to the ground, thus acting as a buffer for the same, as well as assisting in the raising operation. When the hand lever is operated it swings the lever 19 and causes the arm 25 thereof to be engaged and held by the roller 26.

When drawn by a tractor, a draft bar 50 is provided which may be hitched to any suitable connection on the tractor frame, this draft bar having its rear end pivotally connected by a bolt 52 with a pair of hangers 53 which have their upper ends pivotally connected to the frame member 4 by a bolt 54. A draft rod 55 has its forward end pivotally connected with the bolt 52 and its rear end pivotally connected with the yoke 9. A second draft rod 56, pivotally connected with the yoke, extends to a suitable point of attachment with the frame member 2. By this manner of connecting the draft bar 50 and draft rod 55, the necessary forward movement of the draft rod 55 when the yoke 9 is elevated during the raising operation, and also the vertical swinging movement of the draft bar, is compensated for. It will be understood in this connection that the forward extension 5 of the main frame is supported near its forward end by a caster wheel 5ª, so that any relative movement between the mower frame and the tractor, due to unevenness of travel, will be compensated for by the vertical swinging movement of the draft bar 50.

Having thus described my invention, I claim:—

1. In a mowing machine, the combination, with cutting devices, of a continuously rotating ratchet wheel, a pawl lever mounted to oscillate at the side of said wheel and having a connection with said cutting devices, a pivoted pawl carried by said lever, means for throwing said pawl into engagement with said wheel, means for throwing said pawl out of engagement with said wheel, after a predetermined movement thereof, a detent to engage said lever to hold it in the position to which it is moved by said ratchet wheel, and means for releasing said detent.

2. In a mowing machine, the combination, with cutting devices, of a continuously rotating ratchet wheel, a pawl lever mounted to oscillate at the side of said wheel and having a connection with said cutting devices, a pivoted pawl carried by said lever, an operating lever for throwing said pawl into engagement with said wheel, a fixed part for throwing said pawl out of engagement with said wheel after a predetermined movement thereof, a detent to automatically engage and hold said pawl lever in the position to which it is moved by said ratchet wheel, and means operated by said operating lever for releasing said detent.

3. In a mowing machine, the combination, with cutting devices, of a continuously rotating ratchet wheel, a pawl lever mounted to oscillate at the side of said wheel and having a connection with said cutting devices, a pivoted pawl carried by said lever, a normally inactive spring for said pawl, means for throwing said pawl into engagement with said wheel, the movement of said pawl causing said spring to be rendered active to hold the pawl in engagement with said wheel, a fixed part for throwing said pawl out of engagement with said wheel after a predetermined movement thereof and rendering said spring inactive, a detent to automatically engage and hold said pawl lever in the position to which it is moved by said ratchet wheel, and means for releasing said detent.

4. In a mowing machine, the combination, with cutting devices, of a continuously rotating ratchet wheel, a pawl lever mounted to oscillate at the side of said wheel and having a connection with said cutting devices, a pivoted pawl carried by said lever, a normally inactive spring also carried by said lever, an operating lever for throwing said pawl into engagement with said wheel and rendering said spring active to hold said pawl in engaged position, a fixed part for throwing said pawl out of engagement with said wheel after a predetermined movement thereof and rendering said spring inactive, a detent to automatically engage and hold said pawl lever in the position to which it is moved by said ratchet wheel, and a connection between said detent and operating lever whereby the detent may be released.

5. In a mowing machine, a pivoted shoe having cutting devices carried thereby, a pivoted operating lever, a second lever between said operating lever and shoe and arranged transversely of the machine, a link connecting the grassward end of said second lever with said operating lever, and connections between the stubbleward end of said second lever and said shoe.

6. In a mowing machine, a pivoted shoe having cutting devices carried thereby, a lever pivoted to said shoe and arranged to fulcrum on a projecting part thereof, an operating lever, an intermediate lever between said operating lever and shoe and arranged transversely of the machine, a link connecting the grassward end of said intermediate lever with said operating lever, and a second link for connecting the stubbleward end of said intermediate lever with the free end of said shoe lever.

7. In a mowing machine, a pivoted shoe having cutting devices carried thereby, a pivoted hand lever, a second lever pivotally connected with said shoe and having a fulcrum upon a projecting part thereof, and a pivoted intermediate lever linked to said hand lever and to said second lever.

8. In a mowing machine, a coupling frame member movably connected with the main frame, a shoe having cutting devices pivotally connected with said coupling member, a hand lever supported by said main frame, a second lever pivotally connected with said shoe and having a fulcrum on a projecting part thereof, an intermediate lever pivotally connected with said coupling member, and connections between said intermediate lever and the other two levers.

9. In a mowing machine, a coupling frame member having one end thereof movably connected with the main frame, a shoe having cutting devices and being pivotally connected with the other end of said coupling member, a hand lever supported by said main frame, a second lever pivotally connected with said shoe and having a fulcrum on a projecting part thereof, an intermediate lever pivotally connected with said coupling member, connections between said intermediate lever and the other two levers, and power operated devices having a connection with said hand lever, together with a separate control lever for throwing said power devices into operation.

10. In a power lifting mechanism, a constantly rotating member, an actuating member operated therewith, means for throwing said actuating member into driving relation with said constantly rotating member including a control lever, a pair of arms pivotally connected together, a stationary part to which one of said arms is also pivoted, means for pivotally connecting the other arm to said lever, a roller carried by said arms, and a spring for holding said roller in the path of said actuating member, said member having a recess to receive said roller to latch said member in the position to which it has been moved by said constantly rotating member.

11. In a power operated mechanism, a constantly rotating ratchet wheel, an actuating member loosely mounted upon the axis of rotation of said ratchet wheel, a pivoted dog carried by said actuating member, means for throwing said dog into operative relation with said ratchet wheel, an arm connected with said dog, a rod connected with said arm and pivotally carried by said actuating member, and a spring on said rod bearing against the end of said arm for holding said dog in either its engaged or disengaged position.

12. In a mowing machine, a main frame having a forwardly projecting member, a pivoted hanger at the forward end of said member, a support movably connected to said main frame, cutting devices having a connection with said support, a draft rod pivotally connected with said support, a draft bar, and means for connecting said draft rod and said draft bar with said hanger at a common point.

In testimony whereof, I have hereunto set my hand this 21st day of November 1921.

WALLACE S. THOMAS.